(No Model.)
A. T. FIRTH.
ICE VELOCIPEDE.
No. 512,690. Patented Jan. 16, 1894.
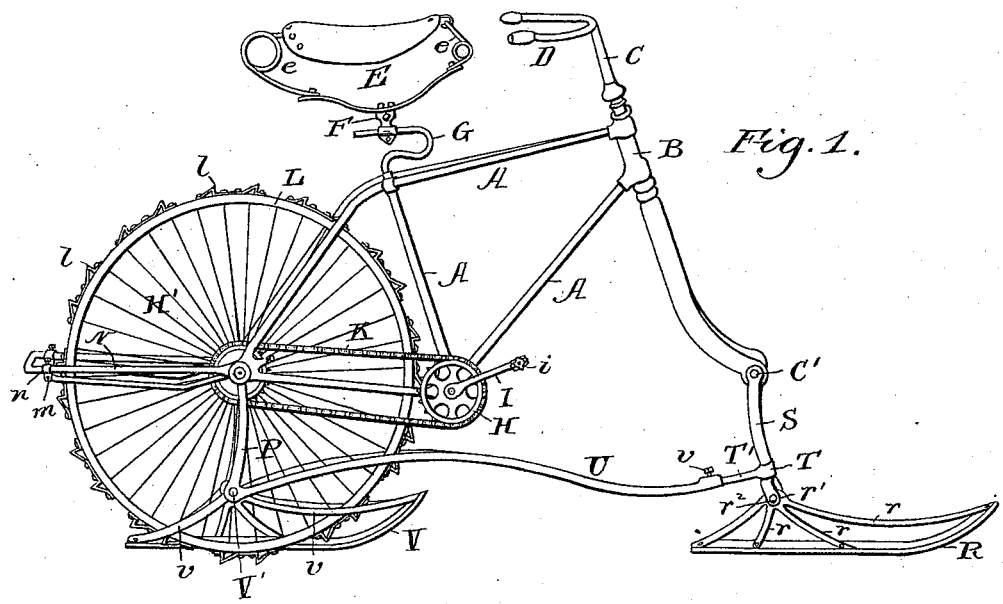
Fig. 1.
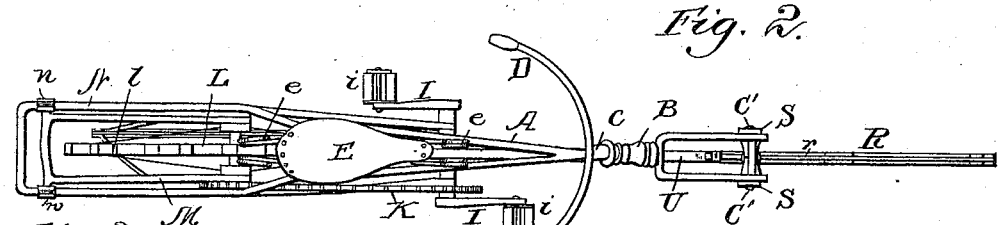
Fig. 2.
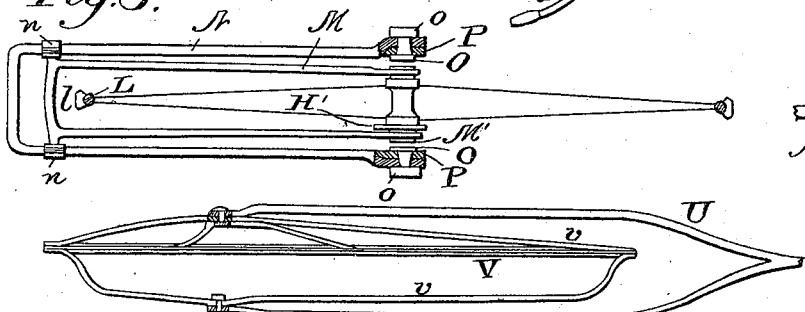
Fig. 3.
Fig. 4.
Fig. 5.
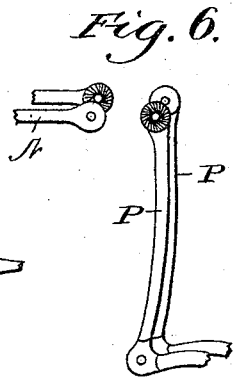
Fig. 6.
Witnesses:
J. B. McGivr.
G. M. Copenhaver.
Inventor.
Alfred T. Firth
by Connolly Bros.
Attorneys
THE NATIONAL LITHOGRAPHING COMPANY,
WASHINGTON, D. C.

UNITED STATES PATENT OFFICE.

ALFRED THOMAS FIRTH, OF CHICAGO, ILLINOIS.

ICE-VELOCIPEDE.

SPECIFICATION forming part of Letters Patent No. 512,690, dated January 16, 1894.

Application filed March 9, 1893. Serial No. 465,286. (No model.)

*To all whom it may concern:*

Be it known that I, ALFRED THOMAS FIRTH, a citizen of the United States, residing at Chicago, in the county of Cook and State of Illinois, have invented certain new and useful Improvements in Velocipedes; and I do hereby declare the following to be a full, clear, and exact description of the invention, such as will enable others skilled in the art to which it appertains to make and use the same.

My invention has relation to velocipedes, and relates in particular to that class of inventions known as safety bicycles, and the primary object of my invention is to provide an attachment for a bicycle which will transform it into an ice velocipede, or vehicle adapted to be propelled over the surface of ice or snow at a high rate of speed.

While it is the object of my invention to provide an attachment to safety bicycles of the ordinary form, and to utilize the parts of the bicycle so far as possible, yet my improved ice velocipede may be constructed with a view solely to its employment as a vehicle to run on the ice or snow, in which case some slight differences in structure may be advantageously made, and will be hereinafter indicated, but in the device illustrated in the accompanying drawings, my invention is shown only as an attachment to the frame, the driving and steering mechanisms of a safety bicycle.

My invention consists in the novel constructions, combinations and arrangements of parts hereinafter described.

Referring to the accompanying drawings, Figure 1 is a side elevation of my improvements applied to a safety bicycle; Fig. 2, a top view of the same; Fig. 3, a plan view partly in section of a portion of the apparatus; Fig. 4, a similar view of another portion of the apparatus; Fig. 5, a side elevation on an enlarged scale of a portion of the driving wheel, and Fig. 6, a detail view in perspective of a part of the frame.

A, A, A, A, designate the steel tubular sections which constitute the main frame of a safety bicycle of well known form and construction.

B designates the steering head through which passes a steering rod C having at its upper end a steering handle D. The lower end of the steering rod is forked and eyes are formed at the lower ends of the forks to receive the shaft of the front wheel.

E designates the saddle mounted on springs e, e, and attached in the usual manner to the frame of the machine by an adjustable clip F embracing a saddle-rod G.

H designates the forward sprocket wheel of the driving mechanism, suitably journaled on the main frame and revolved by means of the cranks I, I, and pedals i, i, and K designates the driving chain which extends from the forward to the rear sprocket wheel of the machine and transmits power from the one to the other. The rear portion of the main frame of the machine is, it will be observed, forked and between the forks of the said portion is ordinarily arranged the rear wheel of the bicycle.

When my improvements are to be applied, both wheels of the bicycle are removed, and in lieu of the rear or driving wheel of the bicycle I employ a light, narrow steel wire spoked wheel L having teeth l, l, on its rim, which will cut into and catch on the surface of the ice or snow over which the apparatus is to be propelled. An enlarged section of the wheel L is shown in Fig. 5 of the drawings and it will be observed that the general form and construction of this wheel are the same as that of the bicycle wheels in general use at present, except that the rubber tire is dispensed with and a series of curved bars l', l' are secured to the rim or felly of the wheel by machine-screws l², l² and teeth l, l, are formed integral with the bars by bending the latter to the required shape before placing them in position on the wheel. These teeth are formed each with one side radial to the wheel and the other side at a tangent, so that they will present a flat side to bear against the ice or snow as the wheel is turned, and will have sharp cutting edges which will readily enter the ice. The wheel L is not journaled directly in the frame of the machine, but is journaled between the arms of a frame M which is pivoted at m, m, to clips n, n, which are secured to the horizontal arms of a frame N, projecting rearwardly from the main frame of the machine. The frame N is attached to the main frame of the machine by bolts O, O, and nuts o, o, and these bolts also pass through eyes in the ends of vertical frame sections P, P, which form part of the frame to which the runners are attached, as will be presently described.

The ends of the frame N, and of the tubular sections P, P, where the bolts O, O, pass through are flattened and roughened or serrated, as is clearly shown in Fig. 6 of the drawings, so that the frame N may be adjusted at any desired angle with relation to the frame of the machine and will be firmly held in position by the engagement of the serrated surfaces on the frame section N, and the tubular sections P, P, when the nuts o, o, are tightened up. The wheel L is journaled in the frame M by means of a shaft M' passing through the hub of the wheel and the eyes in the ends of the frame, and this shaft may be mounted in a manner similar to the shafts of bicycles, that is, with ball bearings, &c., and carries a sprocket wheel H' around which passes the driving chain K, from the forward sprocket wheel H.

When the machine is at rest and the teeth l, l, are just touching the surface of the ice, the driving chain and the frame M are at a slight angle to each other, the apex of the angle being the center of the bolt M', and when the machine is put in motion, the pull of the drive-chain on the rear sprocket wheel has a tendency to align the frame and the drive chain and presses the wheel L down upon the ice with considerable force, enough, in fact, to force the teeth l, l, on the wheel deeply into the ice or surface on which the machine is traveling.

The relative angles of the driving chain K and the swinging or pivoted frame M may be varied, by loosening the nuts o, o, on the bolts O, O, and then raising or lowering the outer end of the frame N, thus raising or lowering the pivotal point of the swinging frame M, and causing the latter to assume a position of greater or less angle to the driving chain. The proper tension of the driving chain may be secured by the adjustment of the clips n, n, upon the frame N,—these clips constituting the pivotal points of the swinging frame M, as before described.

The machine above described being intended to run on ice or snow, is supported solely on blades or runners, and the sole function of the wheel L is to propel the machine along, the only pressure imposed upon the wheel being that transmitted to it by the pull of the driving chain, and this pressure is just sufficient to cause the teeth on the wheel to bite into the surface of the ice or snow and propel the machine.

The front part of the machine is supported upon a blade or runner R, which has braces r, r, r, leading to a point r', where an eye is formed through which a bolt $r^2$ passes, which bolt also passes through eyes on the lower end of a forked supplementary steering rod S which is connected to the steering rod C by a bolt C', which is fitted into the holes in the steering rod C normally forming the journals for the shaft of the front wheel. The supplementary steering rod S passes through a supplementary steering head T, and upon the head is formed a rearwardly projecting spur T' upon which is fitted the hollow end of a forked frame U, that projects back to, and is securely attached to, the lower ends of the vertical frame sections P, P. A screw u passes through the end of frame U, and by means of said screw the frame may be lengthened or shortened.

V designates the blade or runner upon which the rear part of the machine is supported. I have shown but one such runner in the drawings, and I have found it practical to sit and ride the machine with but two runners, one in the front and one in the rear; but if desired, two runners may be arranged side by side to support the machine in the rear.

The blade or runner V is connected to the frame U, by braces v, v, v, and bolts V', V', passing through eyes in the braces and eyes in the frame.

Where the machine is made specially for running on ice, and not intended to be used as a bicycle, the steering rod C would extend down to the point of juncture, r', with the runner-braces, and would not be forked. In this case also the frame section U need not be made adjustable, and the frame sections P could be permanently attached to or form part of the frame of the machine.

Having described my invention, I claim—

1. In an ice velocipede, the combination with a frame steering rod, saddle and driving mechanism of a propelling wheel journaled in a swinging frame, the pivotal point of which is in the rear of said wheel, and an adjustable frame upon which said swinging frame is pivoted, substantially as described.

2. In an ice velocipede, the combination with a frame mounted on runners and a driving sprocket journaled on said frame, of a propelling wheel journaled in a swinging frame and an adjustable frame to which said swinging frame is attached, substantially as described.

3. In an ice velocipede, the combination with the organized mechanism of a velocipede mounted on runners, of a sprocket wheel and driving chain, a toothed propelling wheel, a swinging frame in which said wheel is journaled, adjustable clips to which the swinging frame is pivoted, and an adjustable frame carrying said clips and secured to the main frame of the machine by bolts, whereby the pressure imposed upon the propelling wheel may be regulated, substantially as described.

4. In an ice velocipede, the combination of the frame, the driving mechanism and the steering mechanism of a bicycle, with the supplementary steering rod S, the runners R, and V, and the connecting frame sections U and P, the frame N, swinging frame M and propelling wheel L journaled on said swinging frame, substantially as described.

5. An attachment for transforming a safety bicycle into an ice velocipede, consisting of a supplementary steering rod S, a supplementary steering head T, a frame consisting of the sections N, P, and U, runners R and V attached to said frame and a propelling wheel L journaled in a swinging frame M, substantially as described.

6. An attachment for transforming a safety bicycle into an ice velocipede, comprising a supplementary frame adapted to be attached to the main frame of the machine, runners secured to said supplementary frame, a propelling wheel adapted to receive motion through a driving chain from the driving wheel and pedals, and a swinging frame in which said propelling wheel is journaled, the pivotal points of the swinging frame being in the rear of the journals of the propelling wheel, substantially as described.

7. In an ice velocipede, the combination with the main and supplementary frames and the runners, of the adjustable frame N, secured to the main frame, the clips $n, n$, on the frame N, the swinging frame M pivotally attached to said clips, the propelling wheel L journaled in the swinging frame, substantially as described.

8. In an ice velocipede, the combination with the frames, the runners and the driving mechanism, of a propelling wheel L having the bent plates $l'$, $l'$, formed with integral teeth $l, l$, produced by crimping the plates, substantially as described.

In testimony whereof I have affixed my signature in presence of two witnesses.

ALFRED THOMAS FIRTH.

Witnesses:
J. H. COLEMAN,
A. B. COLEMAN.